(No Model.)   2 Sheets—Sheet 1.

S. V. KENNEDY.
LUBRICATING DEVICE.

No. 530,590.   Patented Dec. 11, 1894.

Witnesses:
Jas. F. Earley
R. T. Ball

Inventor
Samuel V. Kennedy.
by ——— Atty (No Model.) 2 Sheets—Sheet 2.
S. V. KENNEDY.
LUBRICATING DEVICE.
No. 530,590. Patented Dec. 11, 1894.
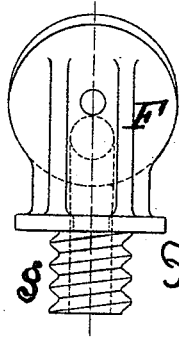
Fig. 4.
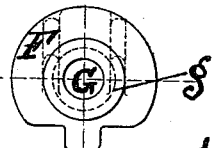
Fig. 5.
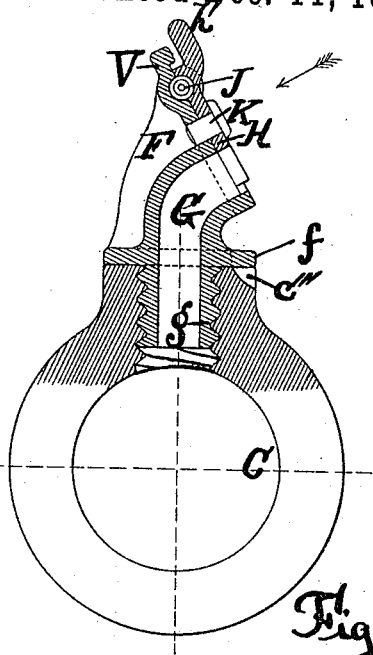
Fig. 3.
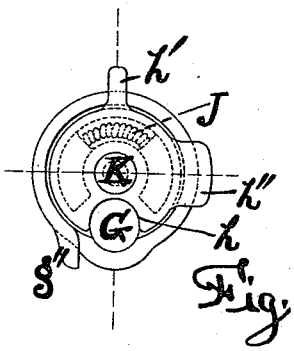
Fig. 6. Fig. 7. Fig. 8.
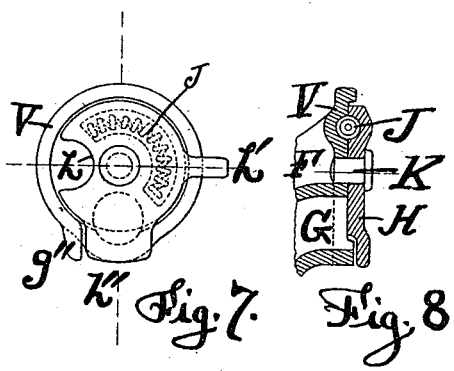
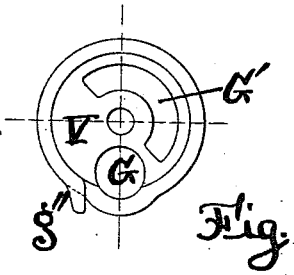
Fig. 9.
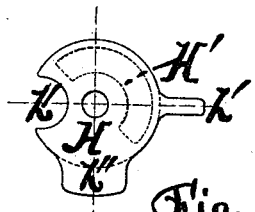
Fig. 10.
Witnesses: Jas. F. Earley, R. S. Ball
Inventor: Samuel V. Kennedy

UNITED STATES PATENT OFFICE.

SAMUEL V. KENNEDY, OF ST. PAUL, MINNESOTA.

LUBRICATING DEVICE.

SPECIFICATION forming part of Letters Patent No. 530,590, dated December 11, 1894.

Application filed July 20, 1894. Serial No. 618,125. (No model.)

*To all whom it may concern:*

Be it known that I, SAMUEL V. KENNEDY, of St. Paul, Minnesota, have invented a new and useful Improvement in Lubricating Devices, of which the following is a description, referring to the accompanying drawings, which form a part of this specification.

My invention is particularly applicable to harvesters and like machinery used in the presence of considerable dust or fine particles which are likely to get into the oil cups or oil holes and cause clogging and, eventually, unnecessary wearing and heating of the parts. Such machinery being generally used by men skilled in the particular agricultural or other art for which they are intended, rather than skilled mechanics or engineers, must of necessity be of comparatively simple and durable construction, and must not require too great delicacy of manipulation.

It is the object of the present invention to produce an oiling device which may be cheaply manufactured and applied, and simple in operation and effective in keeping out the particles of grass, grain, dust or other foreign matters.

To these and certain other incidental purposes my invention is embodied in an oil device and its several parts constructed, arranged, combined and used in a manner substantially similar to that hereinafter described, illustrated, and claimed.

The device being of extreme simplicity, will be best understood by the accompanying drawings, wherein—

Figure 1:
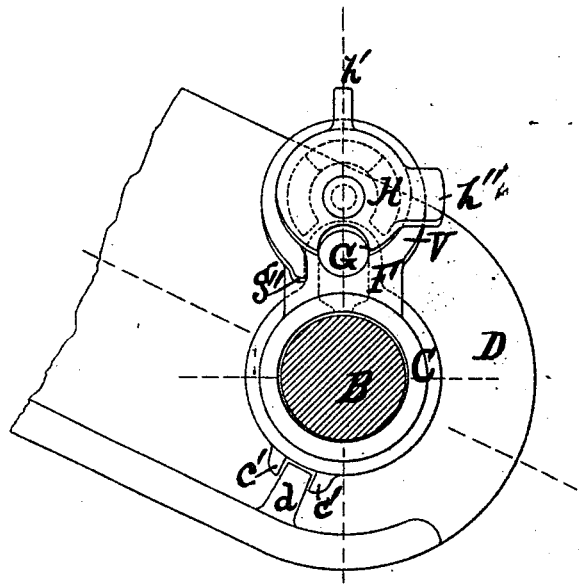
Figure 2:
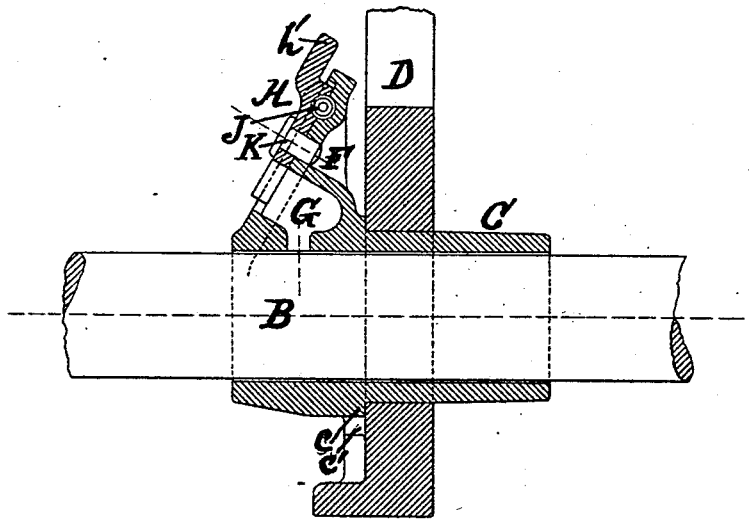

Figure 1 is an axial view of my device as applied to one of the shafts of the harvester. Fig. 2 is a longitudinal section through the center of the device in the plane of the axis of the shaft. Fig. 3 is a transverse section of a modification. Figs. 4, 5, 6 and 7 are rear, bottom and two face views of the same. Fig. 8 is a section through the axis of the rotary cover of my device, and Figs 9 and 10 are detail face views of the rotary cover and its seat.

Throughout the figures like letters of reference indicate like parts.

A shaft, which may be any shaft whatever, is indicated by the reference letter B and to this shaft my oiling device is applied. In Figs. 1 and 2 the oiler is cast with, and forms part of, a bushing C which is mounted within the frame D and forms the bearing for the shaft B. In Fig. 3, the oil device is shown separate from the bushing C, being screw-threaded into it as clearly indicated.

The oiler consists primarily of a cup-shaped or chambered portion F containing the oil passage or oil cup G, which extends toward the shaft and permits the oil to run on to the moving surface of the shaft. The upper portion of the oil cup or passage G is closed by a rotary spring cover H actuated by the spring J.

As the details of the chambered portion F, and the other details of my device are very similar throughout the figures, I will first describe the mounting of the device as a whole, and then set forth the details, operation and purposes, of the various elements which compose it.

In Figs. 1 and 2, the oiler is cast integrally with the bushing or sleeve C, preferably of some anti-friction metal. The bushing or sleeve C is formed to fit and snugly surround the shaft B, and is fitted to and extends through the frame plate D, resting against the shoulder $c$ and held from turning by means of the two small lugs or ears $c'$ which engage the corresponding lug or ear $d$ on the frame. These lugs are in such a position that the oil cup or oil passage G is on the upper side of the shaft, permitting the oil to flow down on to the shaft by gravity.

In Figs. 3, 4 and 5 my oil device is formed separate from the bushing or sleeve C and screw-threaded into it, producing an extremely novel, convenient and satisfactory form of oiler which may be readily applied to any sleeve, it being only necessary to tap and screw-thread the ordinary oil hole in the sleeve, if the sleeve is not already prepared to receive the oiler. The sleeve will, in most cases, be of cast iron, while my oiler is preferably of cast brass or malleable iron provided with the cast screw-threaded extension $g$ of the passage G. The screw threads are loosely fitted within the screw-threaded portion of the sleeve C, and after the device is screwed into place, a portion of the flange of the cup or the projecting lug or ear $f$, clearly seen in Figs. 3 and 5, is struck down into a corresponding notch $c'''$, effectually preventing the unscrewing of the device. This combination between the ear $f$ and the screw threads is very important as it enables a cast thread to be safely employed notwithstanding the looseness of its fit.

The passage-way G may be angular, as clearly shown in Fig. 3, or may be any form that is desired. The form shown in Fig. 3 recommends itself as being very convenient for the insertion of a nozzle of an oil can. In order to cover the mouth of the oil passage, the chambered portion F is provided with a circular plate-shaped face V, upon which the cover H is mounted and turns. In Figs. 9 and 10 the face of this portion V, and the cover H are each shown in full face view. The cover as mounted in position, is shown, in Figs. 3 and 6, open, and in 7 and 8 closed. The mouth of the passage-way G is clearly indicated, and the cover H is provided with a recessed or cutaway portion $h$, which may be turned opposite the mouth of the oil passage G as in Fig. 6, leaving the mouth entirely open for the insertion of the nozzle of an oil can. A short projecting ear or lug $h'$ opposite to the recess $h$ forms a handle by which the cover may be readily turned upon its pivot K. The pivot K may be either a rivet or a screw passing through central openings through the cover H and plate V. In the face of the plate and of the cover are semi-circular channels or recesses $G'$ and $H'$ which, when brought opposite each other, form a circular receptacle for the spring J, as most clearly seen in Figs. 2, 3 and 8. These recesses $G'$ and $H'$, are so placed that the spring forces the cover into the position shown in Fig. 7,—the projection or stop $h''$ resting against the stationary stop $g''$, and the cover, in conjunction with the projection $h''$, covering the mouth of the oil passage G. When it is desired to introduce oil, the cover is turned and the oil passage uncovered, by means of the lug or ear $h'$, and when the oil has been introduced the cover is released, closing the mouth of the oil passage, and effectually preventing the entrance of dust or small particles of grain, grass and other foreign matter. As the parts are very roughly and cheaply made, it may, in many cases, be necessary to close the oil passage by hand, relying on the spring only to hold it closed, and in many cases I entirely omit the spring, as the weight of the projections $h'$ and $h''$ in itself tends to keep the cover closed; and the opposite portion, being recessed at $h$, increases the action of gravity in holding the parts in position.

Such briefly is a description of the preferred embodiments of my invention, but I do not wish it to be understood that I am limited to the precise details described and illustrated except so far as they are clearly essential to the carrying out of the principles and purposes of the invention, for

I claim, and desire to secure by these Letters Patent of the United States, together with all such modifications and additions as may be made by mere skill in the art without departing from the principles involved, and with only the limitations and restrictions expressed or by law implied in view of the prior art, the following:

1. In combination with a bushing or bearing, an oil device having an oil passage G and a pivoted or rotary cover H and a spring, located in recesses $G'$, $H'$, whereby the said cover may close the said oil passage and be held in position by the action of the spring, or may be opened for the supplying of oil, substantially as and for the purposes set forth.

2. In combination with a sleeve, bushing or bearing, an oil device provided with screw-threaded extension $g$ and cast or otherwise roughly formed, in combination with a portion, lug, or ear, $f$ arranged to be struck down or otherwise brought into engagement with the surface into which the said device is screw-threaded for the purpose of preventing the unscrewing, substantially as set forth.

3. In combination as an oil device constructed to be used in the manner described, a chambered portion F provided with a screw threaded extension $g$ and a projecting flange or ear $f$, and a rotary cover H arranged to be turned into position either to cover the mouth of the oil passage, or to leave the same unobstructed, substantially as set forth.

4. In combination in an oiling device and for the purposes described, the plate shaped portion V, cover H pivoted thereto and formed to open or close the mouth of the oil passage or cup, and a spring J operating in the concentric recesses $G'$, $H'$ to close the said cover over the said mouth, substantially as set forth.

5. In combination with a sleeve bushing or bearing, a cast brass or cast metal oil device provided with a screw thread extension arranged to fit roughly within a correspondingly screw-threaded portion of the said sleeve or bushing, and a flanged portion, lug, or ear, $f$ and co-operating recess $c'''$, the said portion, lug, or ear, $f$ being formed to clear the said recess during the action of screwing the said device into place and to then be bent into permanent engagement with the said recess $c'''$, substantially as set forth.

In testimony whereof I have hereunto set my hand this 3d day of July, A. D. 1894, at the said city of St. Paul, Minnesota, and in the presence of the two subscribing witnesses.

SAMUEL V. KENNEDY.

Witnesses:
R. T. BALL,
H. P. FINIGAN.